S. V. MAWN.
BALL BEARING.
APPLICATION FILED MAY 12, 1916. RENEWED APR. 30, 1917.
1,246,450.
Patented Nov. 13, 1917.
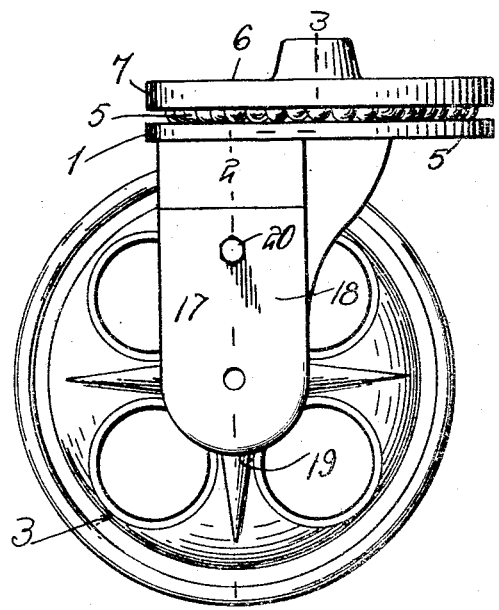
FIG. 1.
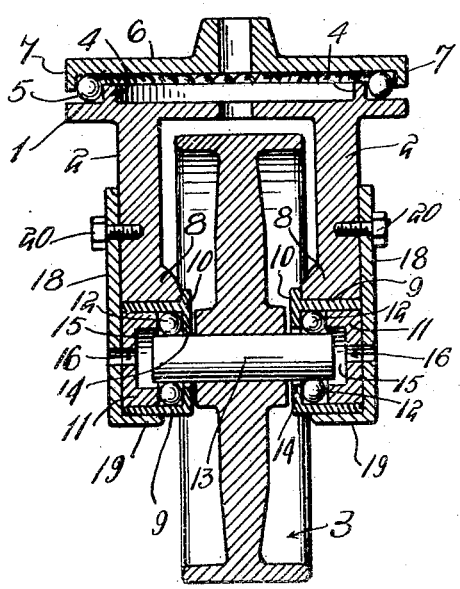
FIG. 2.
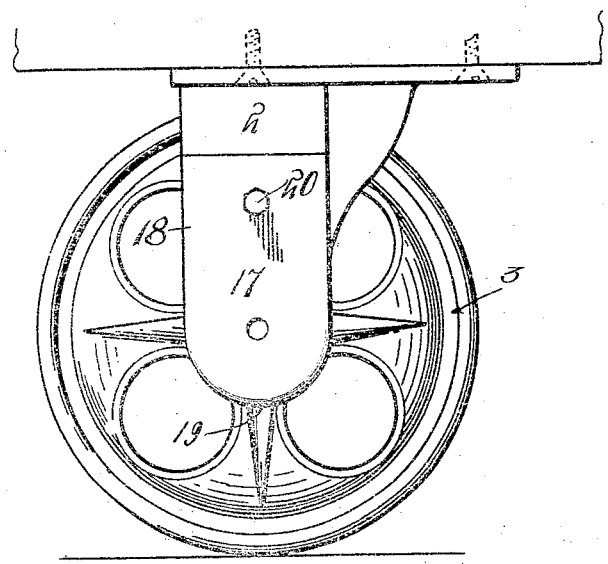
FIG. 3.
Witness
J. C. Simpson
Inventor
S. V. Mawn.
By 
Attorneys.

UNITED STATES PATENT OFFICE.

STEPHEN V. MAWN, OF JOHNSONBURG, PENNSYLVANIA.

BALL-BEARING.

1,246,450.
Specification of Letters Patent.
Patented Nov. 13, 1917.

Application filed May 12, 1916, Serial No. 97,116. Renewed April 30, 1917. Serial No. 165,607.

*To all whom it may concern:*

Be it known that I, STEPHEN V. MAWN, a citizen of the United States, residing at Johnsonburg, in the county of Elk, State of Pennsylvania, have invented certain new and useful Improvements in Ball-Bearings; and I do hereby declare the following to be a full, clear, and exact description of the invention, such as will enable others skilled in the art to which it appertains to make and use the same.

This invention relates to casters, particularly of the type belonging to ball bearing rollers.

The first object of this invention is to construct ball bearing mountings for the axles and shafts of rollers and pulleys, which are adapted for general use either in floor or overhead journal bearings.

A further object of the invention is to improve the construction of ball bearing rollers, which are particularly adapted for use upon the trucks which are used in warehouses, mills and libraries and other places where trucks are employed for the transportation of goods from one part of a building to another, or upon other vehicles requiring the use of ball bearing rollers.

It is also an object of the invention to provide a roller bearing for journals of factory and warehouse trucks and analogous vehicles which is not rendered unfit for use when any of its parts are broken, but which on the other hand, may be supplied with duplicate parts to replace the broken elements, so that the repaired bearing will be as effective as in its original condition.

With the above and other objects in view, as will hereinafter appear, my invention will now be fully set forth and described, reference being had to the accompanying drawings.

In said drawings:—

Figure 1 is a side elevation,

Fig. 2 is a section on line 2—2 of Fig. 1, and

Fig. 3 is a side elevation of a modified form of the invention.

In the present case, the bearing is embodied in a caster for warehouse trucks, but as hereinbefore set forth, this is only one practical use to which the bearing may be put.

Referring to said drawings 1 denotes a turn plate, from whose lower face depends the pair of arms 2, said arms 2 providing the support for a caster wheel 3. The upper face of the turn plate 1 carries a flange 4, which together with the upper face of the plate 1 provides a raceway for the balls 5. The raceway thus formed coöperates with the lower face of a cover plate 6 and the flange 7 thereof to hold the balls in place. The arms 2 terminate at their lower ends in the enlarged sections 8, said sections 8 being formed at the lower ends of the arms into semi-circular recesses. Said recesses provide seats for the bearing cups 9. The bearing cups 9 are substantially cylindrical in form, and are closed at one end, the closed end being provided at one side with a flange 10, which is adapted to bear against the enlarged section 8 for the purpose of aiding and positioning the bearing cup. Within the bearing cups 9 are provided the plugs or closures 11, which secure within the cups 9 the ball bearings 12.

The caster wheel 3 is provided with a fixed shaft 13, said shaft having its ends projected through central apertures 14 provided in the bottoms of the bearing cups 9 and being centered by means of the ball bearings 12, the shaft 13 thus running substantially free of the apertures 14. The inner faces of the plugs 11 are provided with the recesses 15, which may contain lubricant, the latter being introduced therein through the openings 16 formed in the outer ends of the plugs. The bearing cups are retained in position by means of the cover plates 17. Said cover plates consist of the side plates 18 on which are formed the flanges 19, which surround the lower curved ends and the marginal edges of the sides 18, and support the bearing cups 9 in position. The plates 17 are secured to the arms 2 by means of the bolts 20, substantially only one of the bolts 20 being required for each plate since the flanges 19 otherwise position the plates and lock them against movement relative to the arms 2.

In the form shown in Fig. 3, the turn plate and the ball bearing associated therewith are eliminated, this caster being used in circumstances where the rotary bearing is not required. The remainder of the bearing is constructed substantially in the same manner as the above described device.

What is claimed is:—

1. A roller bearing, comprising in combination, a cylindrical cup having a central opening in its bottom, a cup-shaped plug inserted in said cylindrical cup with its edge in opposition to the bottom of the latter, and balls inserted between said edge and said bottom.

2. A roller bearing, comprising in combination, a pair of bearing arms, cylindrical bearing cups fitted upon the free ends of said arms, and having their bottom ends in substantial coincidence with the inner faces of the latter, flanged elements overlying the peripheries of said cups and providing base plates which inclose said cups in the outer faces of said arms, hollow plugs inserted in said cups and retained by said base plates, balls inserted between the bottoms of the cups and the inserted ends of the plugs, and a roller shaft extending through the bottoms of the cups and resting on said balls.

In testimony whereof, I affix my signature, in the presence of two witnesses.

STEPHEN V. MAWN.

Witnesses:
  LAURENCE MAWN,
  L. G. MECHAN.

Copies of this patent may be obtained for five cents each, by addressing the "Commissioner of Patents, Washington, D. C."